July 18, 1950  J. R. WRATHALL  2,516,038
CONTROL SYSTEM FOR REEL DEVICES
Filed Sept. 9, 1947
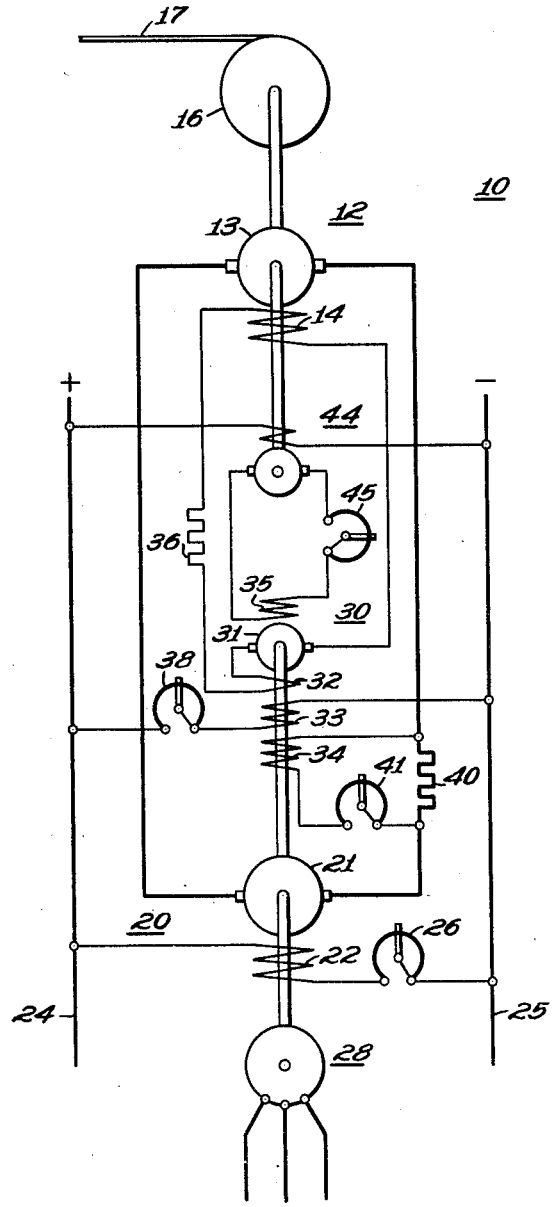
WITNESSES:
Robert C. Baird
F. V. Giolma
INVENTOR
John R. Wrathall.
BY
ATTORNEY Patented July 18, 1950

2,516,038

UNITED STATES PATENT OFFICE 2,516,038

CONTROL SYSTEM FOR REEL DEVICES

John R. Wrathall, East Aurora, N. Y., assignor to Westinghouse Electric Corporation, East Pittsburgh, Pa., a corporation of Pennsylvania Application September 9, 1947, Serial No. 772,941

9 Claims. (Cl. 318—6)

My invention relates generally to control systems, and it has reference in particular to control systems for reel devices and the like.

Generally stated it is an object of my invention to provide an improved control system for a reel device that is simple and inexpensive to manufacture, and is reliable and effective in operation.

Most specifically it is an object of my invention to provide, in a reel control system, for gradually changing the tension of a strip material during a reeling operation.

Another object of my invention is to provide, in a control system, for a reel motor for tapering the tension of a strip material as it is being wound in a coil on a reel so as to prevent slipping of the layers of material in the coil.

It is also an object of my invention to provide, in a control system for a reel motor, for controlling the energization of the reel motor field winding so as to progressively decrease the tension of a strip material as it is wound on the reel.

Yet another object of my invention is to provide, in a reel motor control system, for gradually decreasing the effective pattern field of a regulating generator controlling the energization of the field winding of the reel motor, so as to increase the energization of the motor field winding at such a rate as to progressively decrease the tension of a strip material which is being wound on the reel.

Other objects will in part be obvious, and will in part be explained hereinafter.

In practicing my invention in one of its forms, the tension of a strip material being wound on a reel is regulated by using a regulating generator having a pattern field winding and a differential control field winding energized in accordance with the armature current of the reel motor, for controlling the energization of the field winding of the reel motor. The regulating generator is also provided with a compensating field winding which is cumulative with respect to the pattern field winding, and which is energized from a pilot generator whose voltage is proportional to the speed of the reel motor. As the reel motor slows down because of the increasing diameter of the coil of strip material being wound on the reel, the net or effective pattern field of the regulating generator decreases, thus causing the regulating generator to regulate for a lower value of tension in the strip material.

For a more complete understanding of the nature and scope of my invention, reference may be made to the following detailed description, which may be studied in connection with the accompanying drawing, in which the single figure is a diagrammatic view of a reel motor control system embodying the invention in one of its forms.

Referring to the drawing, the reference numeral 10 may denote generally a control system for a motor 12 comprising an armature 13 and a field winding 14, which motor may be connected in driving relation with a reel 16 for winding a strip material 17 into a coil.

The armature 13 may be supplied with electrical energy from any suitable source of variable voltage, such as a generator 20, having an armature 21 and a field winding 22. The armature 21 may be connected in direct circuit relation with the armature 13 of the reel motor. The field winding 22 may be connected to a suitable source of substantially constant voltage electrical energy, such as the control bus conductors 24 and 25, through a field rheostat 26. The generator 20 may be driven by a suitable means such as the alternating current motor 28.

The field winding 14 of the reel motor may be supplied with electrical energy from a regulating generator 30 of the self-energizing type. The generator 30 may comprise an armature 31, a self-energizing type field winding 32, a pattern field winding 33, a control field winding 34 and a compensating field winding 35.

The self-energizing field winding 32 may be connected in series circuit relation with the armature 31 and the field winding 14 of the reel motor, together with a control resistor 36, so as to provide a tuned armature circuit to compensate for the air gap magnetomotive force losses of the regulating generator. The pattern field winding 33 may be connected to the control conductors 24 and 25 through a field rheostat 38, which may be adjusted to vary the tension in the strip 17. The control field winding 34 may be energized in accordance with the armature current of the reel motor 12, and connected in differential relation with the pattern field winding 33. The field winding 34 may be, for example, connected across a resistor 40 in the armature circuit of the reel motor 12, and provided with a rheostat 41 for adjusting its energization.

In order to provide for tapering the tension of the strip 17, which would otherwise be maintained at a substantially constant value by the regulating generator through the interaction of the pattern and control field windings, the compensating field winding 35 may be so connected as to be energized in accordance with the speed of the reel motor 12. For example, the compensating field winding 35 may be energized from a pilot generator 44 having a driving connection with the reel motor 13. A field rheostat 45 may be connected in circuit relation with the field winding 35 to vary the amount of taper in the tension. The field winding 35 may be so connected to the pilot generator 44 as to be cumulative with respect to the pattern field winding 33.

In normal operation, the tension of the strip 17 tends to increase as the diameter of the coil on the reel 16 increases. As the reel motor 12 slows down because of the increasing diameter of the coil, the back voltage generated by the reel motor armature 13 tends to decrease, so that the armature current tends to increase. Accordingly, the energization of the differential control field winding 34 increases. This creates an unbalance between the magnetomotive forces of the control and pattern field winding, so that the output voltage of the regulating generator 30 increases, and as a result increases the energization of the reel motor field 14. The back voltage of the reel motor armature 13 will thereby be raised to the normal value at the reduced speed, so that the armature current of the reel motor will be restored to the normal value for the tension desired in the strip 17. This condition normally continues progressively as the strip winds on the reel so that the tension of the strip is normally maintained at a uniform value.

In the present instance, however, the effective pattern field results from the cumulative effects of the pattern field winding 33 and the compensating field winding 35. Since the energization of the compensating field winding decreases progressively as the reel motor 12 progressively slows down, because of the decreasing speed of the pilot generator 44, the net or effective pattern field also decreases progressively. Accordingly the energization of the control field winding 34 necessary to maintain a balanced operating condition for the regulating generator 30 also decreases progressively. The balanced operating condition referred to in the description for normal operation is therefore obtained for a progressively decreasing value of armature current as the strip 17 winds on the reel. Accordingly, the tension in the strip 17 is progressively reduced as the coil builds up. The rate of reduction or taper in the tension of the strip 17 may be adjusted by varying the operating position of the rheostat 45, so as to vary the energization of the compensating field winding 35.

While my invention has been described in connection with a reel motor and a winding reel, it will be apparent that it may be readily used in connection with a pay-off or unwinding reel. The reel motor which is over-run when used with a pay-off reel, may be controlled in the same manner as described for the reel motor hereinbefore. As the speed of the pay-off reel increases during unwinding, the pilot generator functions to increase the net pattern field and increase the tension of the strip material.

From the above description and the accompanying drawing it will be apparent that I have provided in a simple and effective manner for tapering the tension in a strip material which is being wound on or unwound from a reel. This neutralizes the tendency for the outer layers of the reel to be tighter than the under layers, and thus prevents slipping of the layers with respect to each other, which may mar the finish of the material being wound. A control system embodying the features of my invention is both simple and inexpensive to manufacture, and is reliable and effective in operation.

Since certain changes may be made in the above described construction and different embodiments of the invention may be made without departing from the spirit or scope thereof, it is intended that all the matter contained in the above description and shown in the accompanying drawing shall be considered as illustrative and not in a limiting sense.

I claim as my invention:

1. A control system for a dynamoelectric machine connected in driving relation with a reel device for handling a strip of material in a coil comprising, field excitation means for the machine including a regulating generator normally operable to variably energize the field excitation means to maintain a substantially constant strip tension, and excitation means for the regulating generator including a pilot generator responsive to the speed of the dynamoelectric machine effective to vary the excitation of the machine progressively inversely with the diameter of the coil on the reel device.

2. The combination with a reel motor disposed to operate at a progressively varying speed, of field excitation means for progressively varying the excitation of the motor inversely with the speed of the motor including a regulating generator of the self-energizing type having fixed excitation means and differential excitation means responsive to the load on the motor, and additional excitation means for the regulating generator responsive to the speed of the motor to progressively deviate the excitation of the motor from said inverse relation.

3. In a reel system, a reel motor having an armature and a field winding, excitation means for the field winding of the reel motor including a regulating generator of the self-energizing type, fixed excitation means for the regulating generator, differential excitation means for the generator responsive to the motor armature current, and additional excitation means for the regulating generator cumulative with the fixed excitation means said additional excitation means being directly proportional to the speed of the motor.

4. In a control system for a reel motor disposed to operate at a progressively changing speed having an armature and a field winding, circuit means connected to supply electrical energy to the armature, a regulating generator connected to energize the field winding, excitation means for the regulating generator responsive to the armature current of the motor, and additional excitation means for the regulating generator directly responsive to the speed of the motor and differential with respect to the aforesaid excitation means.

5. A tension control system for a reel motor having a field winding and an armature connected in driving relation with a reel for operation at a progressively decreasing speed for winding a strip material, circuit means connected to supply electrical energy to the armature, a regulating generator having a plurality of field windings connected to energize the motor field winding, circuit means connecting one field winding of the generator to a source of control potential to provide a pattern field, circuit means connecting another of said plurality of field windings for energization in accordance with the armature current of the motor in differential relation with the pattern field, and additional circuit means connecting another of said plurality of field windings for energization directly in accordance with the speed of the reel motor and cumulatively with respect to the pattern field.

6. A control system for a reel motor disposed to wind a strip of material on a reel and having an armature and a field winding comprising, a regulating generator of the self-energizing type connected to effect progressively varying energization of the field winding, said generator having a series type self-energizing field winding and opposed pattern and control field windings energized in accordance with a fixed control potential and the armature current of the motor, respectively, said generator also having a compensating field winding, and a pilot generator having a driving connection with the motor connected to energize the compensating field winding so as to increase the energization of the motor field winding at a rate in excess of the rate required to maintain a constant tension in a strip material being wound on the reel.

7. In a control system for a reel motor connected in driving relation for a reel for winding a strip of material and having an armature and a field winding, circuit means connected to supply electrical energy to the armature, a regulating generator of the self-energizing type connected to supply electrical energy to th field winding, said generator having a plurality of field windings including a series type self-energizing field winding disposed to compensate for the air gap magnetomotive losses of the generator circuit, means connecting one of said plurality of field windings to a source of control voltage to provide a pattern field, circuit means connecting another of said plurality of field windings for energization in accordance with the armature current of the motor and in opposition to the pattern field so as to provide for progressively increasing the energization thereof to maintain a substantially constant strip tension, and a pilot generator having a driving connection with the motor connected to energize yet another of said plurality of field windings in accordance with the speed of the reel motor and cumulatively with respect to said pattern field so as to provide for progressively further increasing the energization of the motor field winding above the value necessary to maintain a constant strip tension.

8. In a control system for a reel motor having an armature and a field winding, variable voltage means connected to supply electrical energy to the armature, a regulating generator having pattern and control field windings energized in opposite senses in accordance with a control voltage and the armature current of the motor for supplying excitation to the motor field winding and maintaining a substantially constant value of motor armature current, said regulating generator having a compensating field winding, and circuit means connected to effect variable energization of the compensating field winding in accordance with the speed of the motor to decrease the value of motor armature current which is maintained by the regulating generator.

9. In a control system for a reel motor having an armature and a field winding, variable voltage means connected to energize the armature, a regulating generator connected to energize the field winding, said regulating generator having pattern and control field winding energized in opposite senses from a source of control potential and in accordance with the armature current of the motor, respectively, for maintaining a substantially constant value of armature current, said regulating generator having a compensating field winding, and a pilot generator connected to energize the compensating field winding cumulatively with respect to the pattern field winding in accordance with the speed of the reel motor so as to provide for progressively increasing the energization of the motor field winding and regulating for a progressively lower value of armature current.

JOHN R. WRATHALL.

REFERENCES CITED

The following references are of record in the file of this patent:

UNITED STATES PATENTS

| Number | Name | Date |
| --- | --- | --- |
| 2,205,204 | King | June 18, 1940 |
| 2,323,741 | Watson | July 6, 1943 |
| 2,432,876 | Formhals et al. | Dec. 16, 1947 |